US011336714B1

(12) United States Patent
Liu et al.

(10) Patent No.: US 11,336,714 B1
(45) Date of Patent: May 17, 2022

(54) QUEUE-BASED DISTRIBUTED TIMER

(71) Applicant: Microsoft Technology Licensing, LLC

(72) Inventors: Xu Liu, Sammamish, WA (US); Steve Chun-Hao Hu, Bellevue, WA (US); Yingji Ju, Bellevue, WA (US); Swadhin Ajay Thakkar, Bellevue, WA (US); Jose Fernandez, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/217,910

(22) Filed: Mar. 30, 2021

(51) Int. Cl.
*G06F 15/16* (2006.01)
*H04L 67/10* (2022.01)

(52) U.S. Cl.
CPC .................................. *H04L 67/10* (2013.01)

(58) Field of Classification Search
CPC .......... G06F 9/48; G06F 9/4825; G06F 9/542; G06F 9/5077; G06F 9/5038; G06F 9/46
See application file for complete search history.

(56) References Cited

U.S. PATENT DOCUMENTS

| 6,453,164 | B1 | 9/2002 | Fuller et al. |
| 6,763,476 | B1* | 7/2004 | Dangi ................... G06F 9/4825 713/502 |
| 7,061,871 | B2 | 6/2006 | Sheldon et al. |
| 7,552,446 | B1* | 6/2009 | Sosnovsky ............. G06F 9/542 713/502 |
| 7,777,777 | B2 | 8/2010 | Bowman et al. |
| 8,179,912 | B2 | 5/2012 | Cosmadopoulos et al. |
| 9,424,075 | B1* | 8/2016 | Halim ..................... G06F 9/542 |
| 9,491,206 | B2 | 11/2016 | Nur et al. |
| 2007/0022192 | A1* | 1/2007 | Nguyen .............. H04L 41/0681 709/224 |
| 2007/0147394 | A1* | 6/2007 | Wilkinson ................ G06F 1/14 370/398 |

(Continued)

FOREIGN PATENT DOCUMENTS

WO 9807262 A1 2/1998

OTHER PUBLICATIONS

"Chapter: show gateway through show modem relay statistics", Retrieved from: https://web.archive.org/web/20141015083333/https://www.cisco.com/c/en/us/td/docs/ios-xml/ios/voice/vcr4/vcr4-cr-book/vcr-s6.html, Oct. 15, 2014, 86 Pages.

(Continued)

*Primary Examiner* — Cheikh T Ndiaye
(74) *Attorney, Agent, or Firm* — NovoTechIP International PLLC

(57) ABSTRACT

A data processing system for providing a distributed timer implements receiving a first timer message associated with a first computing device requesting creation of a first timer having a first duration and a first timer identifier; responsive to the first timer message creating a first timer, and inserting a first timer queue entry into a first timer queue associated with a first timer wait interval; receiving a plurality of second timer messages to reset the first timer; inserting a plurality of second timer queue entries into the first timer queue based on the plurality of second timer messages; and processing timer queue entries in the first timer queue responsive to the first timer wait interval having passed.

20 Claims, 11 Drawing Sheets

(56) References Cited

U.S. PATENT DOCUMENTS

2017/0017260 A1* 1/2017 Bar .......................... G06F 1/12
2020/0296554 A1 9/2020 Chiang et al.

OTHER PUBLICATIONS

Dupont, et al., "Creating Custom Telemetry Events for Event Log Monitoring", Retrieved from: https://docs.microsoft.com/en-us/dynamics365/business-central/dev-itpro/developer/devenv-instrument-application-for-telemetry-event-log, Oct. 1, 2020, 4 Pages.

* cited by examiner

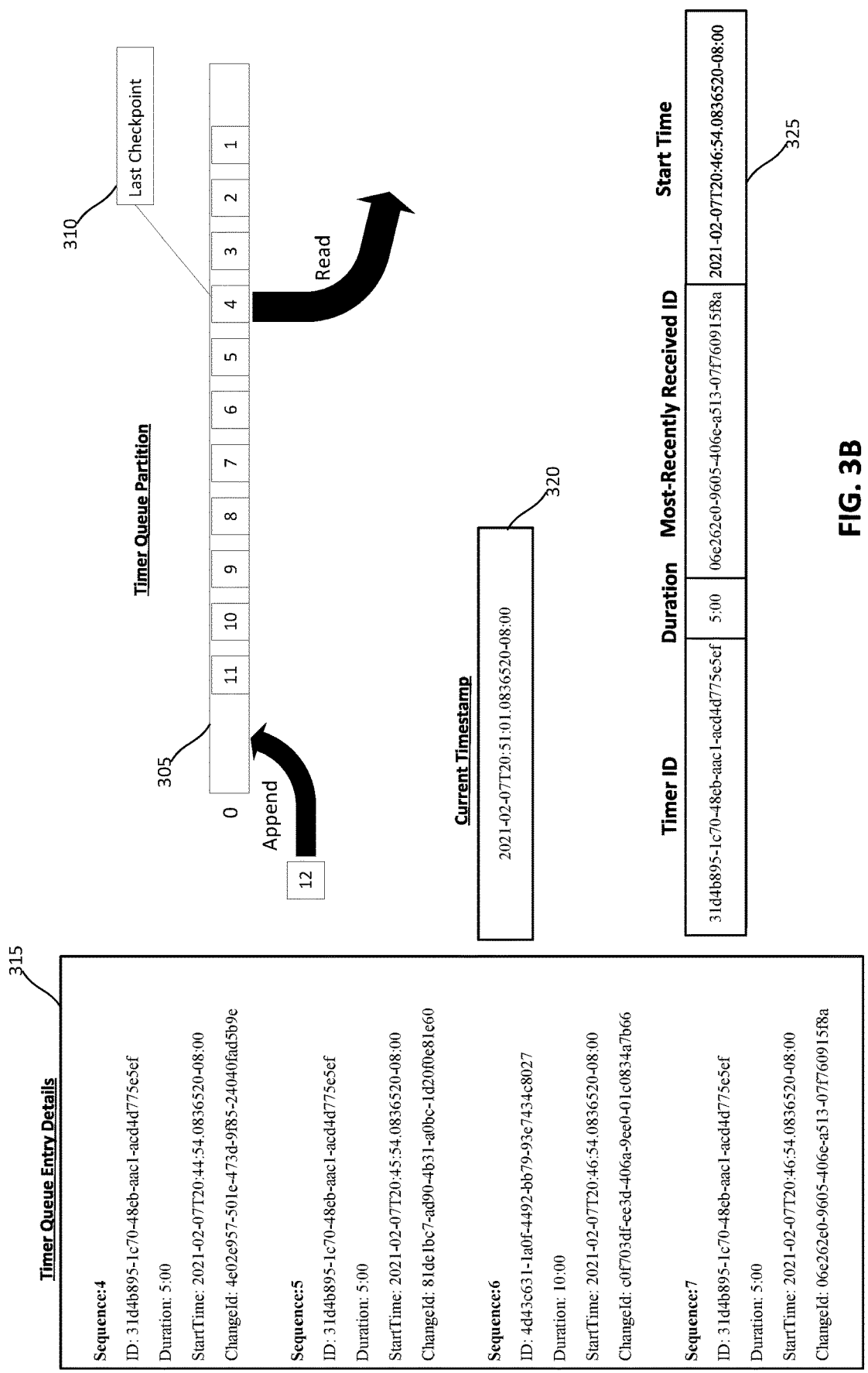

QUEUE-BASED DISTRIBUTED TIMER

BACKGROUND

Many cloud-based or distributed computing environments provide applications and/or services which may be accessed by numerous computing devices. Certain tasks may rely on telemetry data and/or other data collected from multiple computing devices and/or services associated with the cloud-based or distributed computing environment. However, the telemetry data and/or other data may be delayed or lost due to network issues, data loss, problems with a computing device or service, and/or other reasons. As a result, the service performing the task may not be able to determine definitively whether the task has been completed or is still in progress. For at least these reasons, current approaches to providing timers for computing implementations are not suitable for distributed, high-volume systems where the completion of a particular event may depend on information that may be provided by multiple computing devices associated with the distributed system and which may be subject to network latency and/or other issues which may result in the information from the multiple computing devices being lost or delayed. Hence, there is a need for improved systems and methods that enable a technical solution for solving the technical problem of providing timers for distributed, high-volume computer processing applications.

SUMMARY

An example data processing system according to the disclosure may include a processor and a computer-readable medium storing executable instructions. The instructions when executed, cause the processor to perform operations including receiving a first timer message associated with a first device requesting creation of a first timer having a first duration and a first timer identifier; responsive to the first timer message: creating a first timer; and inserting a first timer queue entry into a first timer queue associated with a first timer wait interval, the first timer wait interval indicating how long a timer queue entry remains in the first timer queue before being processed; receiving a plurality of second timer messages to reset the first timer associated with the first device, one or more second devices, or both the first device and the one or more second devices; inserting a plurality of second timer queue entries into the first timer queue based on the plurality of second timer messages; processing timer queue entries in the first timer queue responsive to the first timer wait interval having passed by: identifying a timer queue entry representative of a current state of the first timer; determining whether a respective duration associated with the timer queue entry representative of the current state of the first timer has passed; and sending an indication to the first device whether the first timer has elapsed responsive to the respective duration associated with the timer queue entry representative of the current state of the first timer having passed.

An example method implemented in a data processing system for providing a distributed timer includes receiving a first timer message associated with a first device requesting creation of a first timer having a first duration and a first timer identifier; responsive to the first timer message: creating a first timer; and inserting a first timer queue entry into a first timer queue associated with a first timer wait interval, the first timer wait interval indicating how long a timer queue entry remains in the first timer queue before being processed; receiving a plurality of second timer messages to reset the first timer associated with the first device, one or more second devices, or both the first device and the one or more second devices; inserting a plurality of second timer queue entries into the first timer queue based on the plurality of second timer messages; processing timer queue entries in the first timer queue responsive to the first timer wait interval having passed by: identifying a timer queue entry representative of a current state of the first timer; determining whether a respective duration associated with the timer queue entry representative of the current state of the first timer has passed; and sending an indication to the first device whether the first timer has elapsed responsive to the respective duration associated with the timer queue entry representative of the current state of the first timer having passed.

An example computer-readable storage medium according to the disclosure on which are stored instructions which when executed cause a processor of a programmable device to perform operations of receiving a first timer message associated with a first device requesting creation of a first timer having a first duration and a first timer identifier; responsive to the first timer message: creating a first timer; and inserting a first timer queue entry into a first timer queue associated with a first timer wait interval, the first timer wait interval indicating how long a timer queue entry remains in the first timer queue before being processed; receiving a plurality of second timer messages to reset the first timer associated with the first device, one or more second devices, or both the first device and the one or more second devices; inserting a plurality of second timer queue entries into the first timer queue based on the plurality of second timer messages; processing timer queue entries in the first timer queue responsive to the first timer wait interval having passed by: identifying a timer queue entry representative of a current state of the first timer; determining whether a respective duration associated with the timer queue entry representative of the current state of the first timer has passed; and sending an indication to the first device whether the first timer has elapsed responsive to the respective duration associated with the timer queue entry representative of the current state of the first timer having passed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3B is a diagram of a partition of the timer queue shown in FIG. 3A that includes timer queue entries.

DETAILED DESCRIPTION

Figure 1:
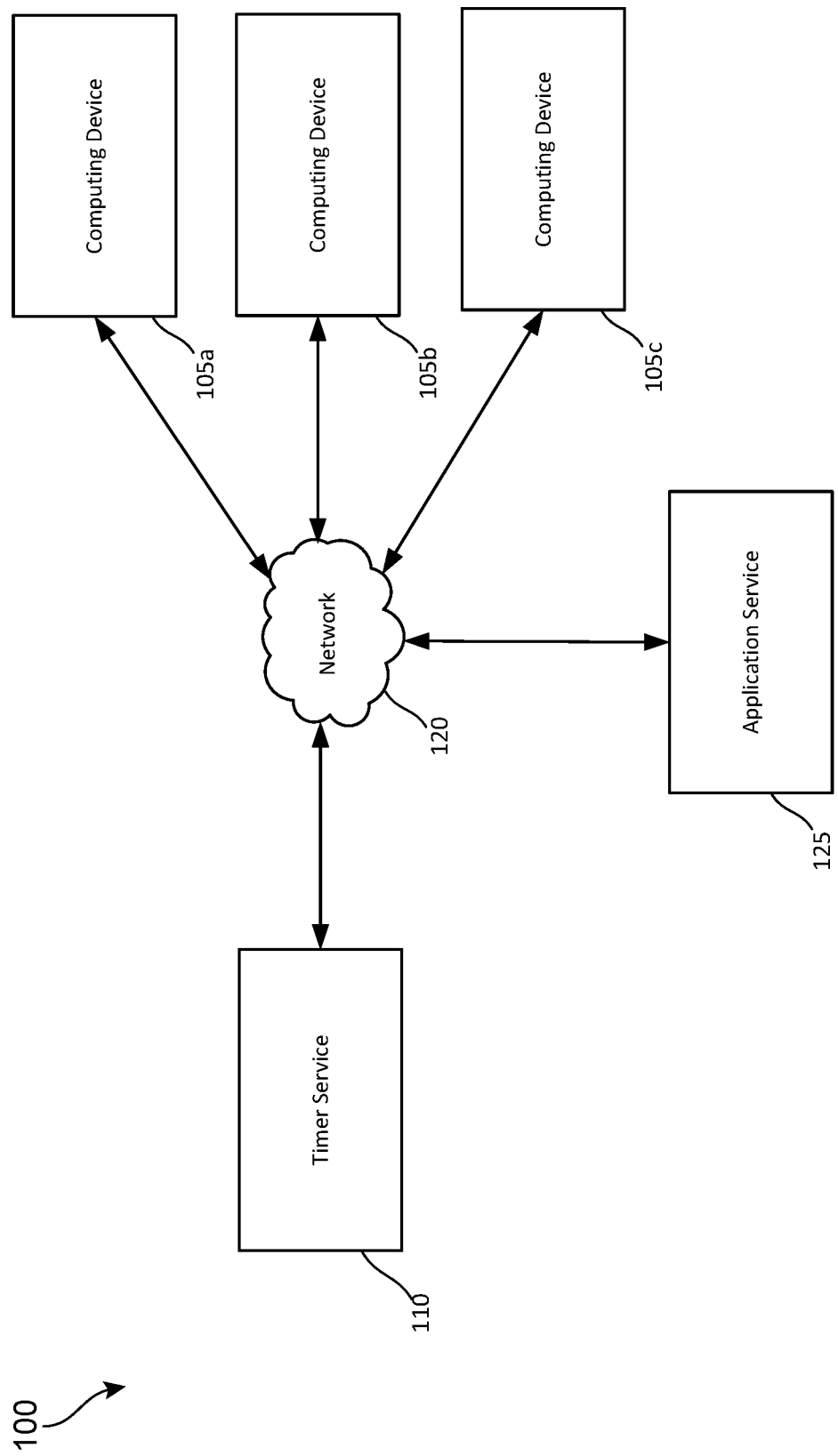
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for implementing a distributed timer service that provides a technical solution to the problem of timing events in cloud-based and/or distributed computing environments. The distributed timer service may implement a timer creator, a timer queue, and a timer responder. The timer creator may create a new timer and may insert timer messages associated with the timer into the timer queue for processing. The timer messages may reset the timer, change the duration of the timer, or both. The timer creator may also create an entry in a timer datastore of the distributed timer service which maintains a record of each of the timers that have been created and are currently active. The timer responder processes the messages in the timer queue to reset the timer, to change the duration of the timer, or both. The timer queue is associated with a timer wait interval, and the timer queue entry remains in the queue for the timer wait interval before the timer responder processes the timer queue entry.

The distributed timer service provides a scalable and low latency timer solution for providing timers in a cloud-based and/or distributed computing environment. A technical benefit of the queue-based approach is that the distributed timer service may handle high volumes of timer change messages without the need to process every timer message associated with a particular timer. The timer responder may identify a timer queue entry representative of a current state of the timer and discard other pending timer queue entries associated with that timer which were received prior to the timer queue entry associated with the current state of the timer. This timer queue entry may be the most-recently received timer messages associated with the timer in some implementations. The timer responder may use the timer information in the timer datastore to identify the timer queue entry representative of a current state of the timer.

Rather than changing the state of the timer each time that a timer message is received, timer entries are created in the timer queue for each timer message received by the timer service, and the timer responder may be configured to discard all but the most recent timer message once the timer entry has been in the timer queue for the timer wait interval. A technical benefit of this approach is that the timer service is very scalable and may provide a timer services for cloud-based and/or distributed computing environment that can handle very high volumes of timer messages without consuming an excessive amount of memory and computing resources of the timer service. These and other technical benefits of the techniques disclosed herein will be evident from the discussion of the example implementations that follow.

FIG. 1 is a diagram showing an example computing environment 100 in which the techniques disclosed herein for a distributed timer may be implemented. The computing environment 100 may include a timer service 110. The example computing environment 100 may also include computing devices, such as the computing devices 105a, 105, and 105c, and an application service 125. The computing devices 105a-105c may communicate with the timer service 110 and/or the application service 125 via the network 120. The application service 125 may also communicate with the timer service 110 via the network 120. The network 120 may include one or more wired and/or wireless public networks, private networks, or a combination thereof. The network 120 may be implemented at least in part by the Internet.

The computing devices 105a, 105b, and 105c are each a computing device that may be implemented as a portable electronic device, such as a mobile phone, a tablet computer, a laptop computer, a portable digital assistant device, a portable game console, and/or other such devices. The computing devices 105a, 105b, and 105c may also be implemented in computing devices having other form factors, such as a desktop computer, vehicle onboard computing system, a kiosk, a point-of-sale system, a video game console, and/or other types of computing devices. Furthermore, the computing device 105a, 105b, and/or 105c may be an Internet of Things (IoT) device having various form factors, including but not limited to sensors, devices configured to acquire and analyze data from connected equipment, automated control systems, and/or other types of IoT devices. While the example implementation illustrated in FIG. 1 includes three computing devices, other implementations may include a different number of computing devices. Furthermore, the timer service 110 may be used by combinations of different types of computing devices. In some implementations, the computing devices 105a, 105b, and 105c may be used to access the applications and/or services provided by the application service 125 and/or the timer service 110. In some implementations, the computing device 105a, 105b, and 105c may be configured to access the timer service 110 for timer services without accessing the application service 125.

The application service 125 may provide one or more cloud-based or network-based services for the computing devices 105a-105c. The application service 125 may provide a communications platform, a collaboration platform, a content sharing platform, a content creation platform, and/or other services that are accessible to users via the computing devices 105a-105c and allow the users to communicate and/or consume, create, share, collaborate on, and/or modify content. Other types of services may be provided by the application service 125 in addition to or instead of these services. The services provided by the application service 125 may be accessed via a native application on a computing device, via a native application configured to communicate with the application service 125, via other means, or via a combination thereof.

The application service 125 may be configured to perform certain actions in response to the status of certain events. For example, the application service 125 may be configured to create a log entry, a billing entry, a summary report, or perform other actions in response to the occurrence of a certain event or in response to the continuation of the event. The application service 125 may be configured to obtain telemetry data and/or other data from the computing devices 105a-105c, from services or other components of the application service 125, and/or from services or other entities external to the application services 125 but configured to provide services to the application service 125 and/or the computing devices 105a-105c. The application service 125 may use the telemetry data and/or other data to determine a state of an event that may trigger the application service 125 to perform certain actions. The application service 125 may not be able to make a definitive determination as to the status of the event due to loss and/or delay of some or all the telemetry data and/or other data. To address this problem, the application service 125 may request the timer service 110 to create one or more timers that may be used to make a definitive determination as to the state of the event. Timer elapse may indicate that the event has completed if no telemetry data and/or other data associated with the event is received within predetermined timeout period. In some implementations, the application service 125 may send a request message to the timer server 110 to create the new timer. In other implementations, the timer service 110 may be configured to create a new timer in response to receiving application telemetry data associated with a type of event for which the timer service 110 is configured to create a new timer.

The timer service 110 is configured to provide a scalable and low latency timer solution for providing timers in a cloud-based and/or distributed computing environment. In some implementations the scalable, timer service may be utilized to determine a definite state for an event in progress. The event in progress may be associated with one or more of the computing devices 105a-105c, the application service, or another network-connected entity or service (not shown). The timer service 110 may be configured to support multiple timers simultaneously. Each timer may have a different duration and may be used for timing numerous different types of events. The timer service 110 may be configured to receive application telemetry data.

Figure 6:
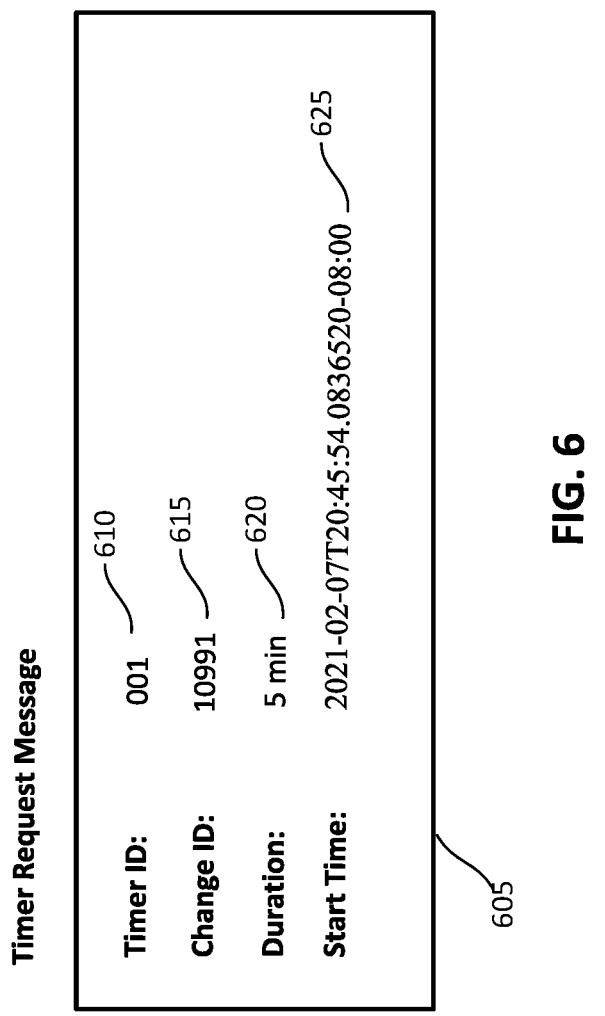
FIG. 6 provides an example of a timer request message that may be sent to the timer service to create a new timer or to reset an existing timer, to change the duration of the existing timer, or both.

The timer service 110 may be configured to allow a computing device, such as the computing devices 105a-105c, the application service 125, or other network-connected service or device to request that a timer be created and to update and/or reset the timer once the timer has been created. The timer service 110 may be configured to respond to timer messages from the computing devices 105a-105c, the application service 125, or other network-connected service or device. Timer messages, as referred to herein, may include timer request messages that are generated by the computing devices 105a-105c, the application service 125, or other network-connected service or device. An example of such a timer request messages is shown in FIG. 6 and is discussed in detail below.

In some implementations, the timer messages may be implicitly created in response to telemetry data. For example, the timer service 110 may analyze telemetry data generated by from services or other components of the application service 125, the computing devices 105a-105c, and/or from services or other entities external to the application services 125 but configured to provide services to the application service 125 to create a new timer or update an existing timer based on the types of telemetry data received. The telemetry data may be generated by these entities for various purposes that may be unrelated to timing of events but may be utilized by the timer service 110 to trigger the timer service 110 to create new timers and/or update existing timers as will be discussed in the examples which follow. For example, the telemetry data may be indicative that the timer service 110 should begin a new timer having a duration associated with the type of event for which a definitive determination of the status of the event is desired. For example, the application data may indicate that an online communication session may have been initiated and a new timer to track whether the online communication session remains active should be created. The timer service 110 may be configured to recognize numerous types of events associated with various types of application services 125.

The timer service 110 may be configured to provide a notification to the entity that requested the creation of the timer in response to the timer elapsing. The timer service 110 may also or alternatively be configured to trigger the execution of one or more processes on the entity that requested the creation of the timer and/or one or more other entities configured to operate with the timer service 110. Additional implementation details of the timer service 110 and examples of the timer messages are provided in the examples that follow. In some implementations, an intermediary device may be configured to send timer messages on behalf of a computing device or service to request the creation of new timers and/or to reset or change the duration of an existing timer.

The following example illustrates one example implementation in which the timer service 110 may be used. This use case demonstrates how the timer service 110 may be used in a cloud-based or distributed computing environment but does not limit the timer service 110 in this specific implementation. In this example, the application service 125 is a communications and collaboration platform, such as but not limited to Microsoft Teams™, which is configured to create a call record upon completion of an online communication session. The call record may be based on telemetry data and/or other information received from the computing devices 105, services provided by the application service 125, and/or from other services or networked entities involved with various aspects of the online communication session. In this example, the call record may provide important information that may be utilized by various aspects of the application service 125, such as call or meeting reporting, performance and reliability monitoring of the application service 125, analytical tasks for reporting, billing, or other purposes, and/or to ensure that certain compliance and/or legal requirements are satisfied in various jurisdictions in which at least a portion of the online communication session took place. The functionality discussed above with respect to the application service 125 may be implemented in multiple services where each service implements one or more aspects of the functionality of the application service 125 discussed herein. For example, returning to the Microsoft Teams™ example discussed above, the application service 125 may be implemented as a first service that is configured to handle functionality for setting up and handling of audio and/or video communication sessions with the computing devices 105a-105c, and a separate logging service may be implemented that is configured to handling logging of events associated with the online communication sessions. The logging service in such an implementation may be configured to utilize the timer service 110.

Because the call record is generated at the end of the communication session, the application service 125 needs to determine when the end of the communication session actual occurred. However, this determination is not always straightforward in a distributed network environment such as that shown in FIG. 1. The telemetry event data which indicates the end of a call may be lost or significantly delayed due to various issues, including but not limited to network problems, telemetry service delays or loss, and/or service failures. These issues may be distributed across the network 120, across various components of the application service 125, and/or the computing devices 105a-105c. Some types of problems may also result in no telemetry event data or no further telemetry event data being sent to the application service 125. Furthermore, even if an "end-call" telemetry event is received, the application service 125 may need to wait for a short period of time in case there is other telemetry event data that has not yet been received from the various entities involved in the communication session. Thus, the application service 125 cannot rely solely on the arrival of expected telemetry event data to determine that a communication session as ended.

The timer service 110 may be used to address these issues by providing a distributed timer service that can be reset and/or for which the duration of the timer may be changed based on the telemetry data received by the application service 125. The timer service 110 provides a configurable timeout mechanism for determining whether the communication session has ended. The application service 125 can send a request to the timer service 110 to set up a new timer having a specified duration. Once the duration associated with the timer has elapsed, the timer service 110 may notify the application service 125 and the application service 125 may create the call record. In other implementations, the timer service 110 may implement a logging service or other service associated with the application service 125 to indicate that the logging service or other service may create the call record.

Application telemetry data may be provided to the timer service 110, and the timer service 110 may be configured to restart the timer, change the duration of the timer, or both in response to the application telemetry data. The application telemetry data may be sent to the timer service 110 by the application service 125, the computing devices 105a-105c, or other network-connected services or devices associated an event for which a timer is to be created. In some implementations, the application telemetry data may be provided to the application service 125 which may provide the application telemetry data to the timer service 110. The timer service 110 may be configured to recognize that certain types of application telemetry data indicate that the timer service 110 should create a new timer for an event. The timer service 110 may also be configured to recognize that other types of application telemetry data indicate that the timer associated with the telemetry data should be restarted, the duration of the timer should be changed, or both. The duration may depend upon the type of application telemetry data that is received by the timer service 110. The timer service 110 may set the timer to a first duration (e.g., 20 minutes) in response to receiving a first type of application telemetry data indicating that an online communication session is ongoing but may set the timer to a second shorter duration (e.g., 1 minute) in response to receiving a second type of application telemetry data indicating that the online communication session may have ended. The timer service 110 may reset the timer and/or change the timer duration in based on the type of application telemetry data. The timer duration eventually elapses once the timer service 110 stops receiving new timer messages, application telemetry data, or other indications to reset the timer, and the timer service 110 may notify the application service 125 that the specified period of time has elapsed or take other actions in response to the timer service elapsing. While this example, and the examples which follow provide example implementation that are associated with online communication sessions, the timer service 110 is not limited to such usage and may be used with other types of services to provide a scalable and generic approach to providing a timer for events in a distributed computing environment.

Figure 2:
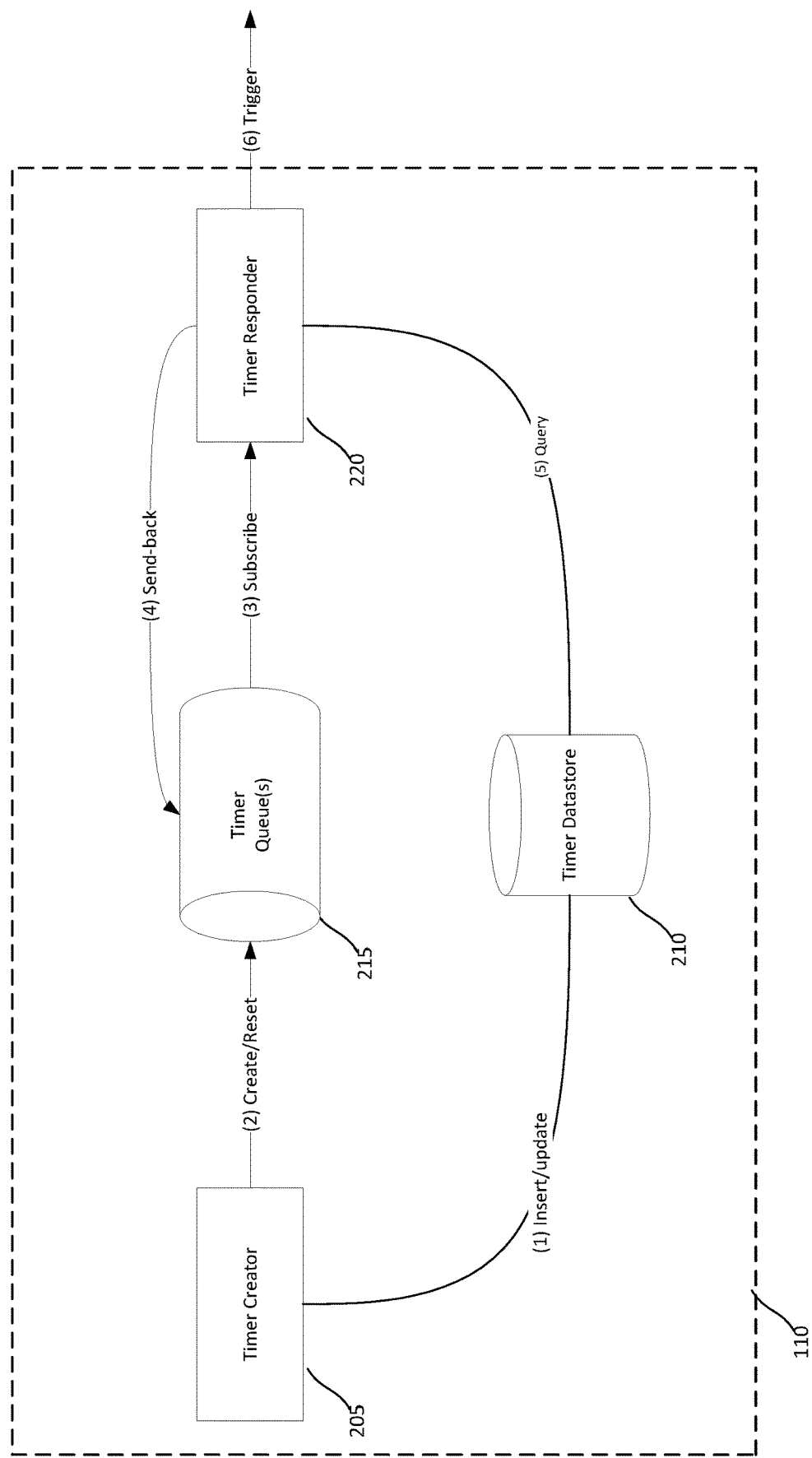
FIG. 2 is an example architecture that may be used, at least in part, to implement the timer service shown in FIG. 1.

FIG. 2 shows an example implementation of the timer service 110 that includes a timer creator 205, a timer datastore 210, timer queue(s) 215, and a timer responder 220. The elements of the timer service 110 may be implemented as a standalone service as shown in FIG. 1 or may be implemented as functionality provided by a service provider, such as the application service 125.

The timer creator 205 may be configured to create or reset timers in response to timer messages. The timer creator 205 may be configured to create or reset timers in response to a request from the application service 125 and/or by a computing device of the computing devices 105a-105c or in response to certain types of application telemetry data received from the application service 125 and/or by a computing device of the computing devices 105a-105c. In the example environment shown in FIG. 1, the timer messages may be timer request messages similar those shown in FIG. 6 or may be implicitly determined based on the application telemetry data.

In implementations where the timer message is a timer request message, a timer request message similar that shown in FIG. 6 may be sent to the timer service 110. As discussed above, the timer service 110 may create or modify a timer in response to a request sent by the application service 125 and/or by a computing device of the computing devices 105a-105c. A timer message to create a new timer may include an indication that a new timer is to be created, while a message to reset or modify an existing timer may include a unique timer identifier assigned to the timer service 110. The device creating the timer message may include an application or service for generating timer messages.

The timer request message 605 may include a timer identifier 610, a timer change identifier 615, a duration 620, and a start time 625. The timer identifier 610 may be set to a unique identifier assigned to the timer by the entity sending the timer message to the timer service 110. The timer identifier may be a Globally Unique Identifier (GUID) or a Universally Unique Identifier (UUID). A GUID or UUID typically comprises a 128-bit number and is used to identify information in computer systems.

The timer request message 605 may also include a timer change identifier 615. The timer change identifier 615 is a unique value that identifies each change being made to a particular timer. The change may include resetting the time, changing the duration of the timer, or both. The timer change identifier 615 may be a GUID or UUID that is generated by entity sending the timer message to the timer service 110. In some implementations, the timer request message 605 may not include the change identifier 605 and the change identifier may be generated by the timer service 110 and associated with the timer request message 605 as the timer request message 605 is received by the timer service 110.

The timer request message 605 may also include a timer duration 620. The value of the timer duration 620 represents how long the timer service 110 should wait before processing the timer message. The timer service 110 may then send a message indicating that the timer has elapsed to the entity that requested that the timer be created and may also or alternatively be configured to trigger the execution of one or more processes on the entity that requested the creation of the timer and/or one or more other entities configured to operate with the timer service 110. The timer duration 620 may be stored in various time increments, such as but not limited to seconds, minutes, or other time increment. Alternatively, the duration may be expressed in terms of a category of timer request message received, and the category may be associated with a particular duration. For example, timer request messages in category "A" may be assigned a duration of 5 minutes, while timer request messages in category "B" may be assigned a duration of 10 minutes.

The timer request message 605 may also include a start time 625. The start time 625 represents the time that the timer message was created. The start time 625 may be stored as a timestamp, which may include a date and time that the timer message is received by the timer creator 205. The timer creator 205 and the timer responder 220 of the timer service 110 may use a synchronized clock, which may be maintained by the timer service 110. The timer service 110 may determine whether the duration 620 has passed by comparing timestamp representing a current time according to the timer responder 220 with the start time 625 to determine whether the duration 620 has passed. The processing of the timer messages by the timer service 110 is discussed in greater detail in the examples which follow.

In implementations where a timer message is implicit and based on telemetry data, the timer service 110 may be configured to extract data from the telemetry data that may be used to create a new timer and/or modify an existing timer. The timer creator 205 may be configured to parse various types of telemetry data to extract information from the telemetry data that may be used to create and/or modify a timer. The timer creator 205 may be configured to extract a timer identifier from the telemetry data. The timer identifier may be a unique identifier obtained from the telemetry data. For example, if the telemetry data is associated with an online communication session, the online communication session may be assigned a unique identifier, which may be a GUID or UUID. An online communication session is one application of the timer service, and the timer service 110 may be utilized to provide a timeout mechanism for other applications or services which need a timeout mechanism for events. The timer creator 205 may also be configured to extract a timer change identifier from the telemetry data. The timer change identifier may be a message identifier or other unique value that is associated with the telemetry data received. The timer change identifier may be a GUID or UUID and may be used to differentiate between telemetry data messages associated with the same unique identifier associated with the communication session or other series of events for which a timeout mechanism for events is desired. The timer creator 205 may be configured to determine whether to create a new timer or to reset an existing timer based on the type or category of telemetry data received. The timer creator 205 may be configured to recognize that certain types or categories of telemetry data are indicative of an event for which a timeout mechanism is required and to create a new timer. Furthermore, the timer creator 205 may be configured to determine whether a new timer is required by comparing the timer identifier extracted from the telemetry data with the entries in the timer datastore 210 to determine whether the telemetry is associated with a new timer or an existing timer. Furthermore, the timer creator 205 may be configured to determine a duration for the new timer based on the type or category of telemetry data received. The timer creator 205 may be configured to map the type or category of telemetry data to a duration. This mapping may be configured by an administrator of the timer service 110 and stored in a persistent datastore associated with the timer service 110. The timer creator 205 may access this mapping information and use this information when parsing telemetry data to determine the duration to associate with a new timer or to which to set the duration of an existing timer. The timer creator 205 may also determine a start time for the timer associated with the telemetry data based on a time at which the telemetry data was received by the timer creator 205. As discussed above, the timer service 110 may maintain a clock which can be used to determine a timestamp for the start time for a timer.

The timer creator 205 may be configured to create or update an entry in the timer datastore 210 in response to receiving a timer message. The timer datastore 210 is a persistent datastore that maintains a record for each of the timers that have been created by the timer service 110. Timers which have elapsed may be removed from the timer datastore 210 or may be retained for at least a period of time after the timer has elapsed.

Figure 5:
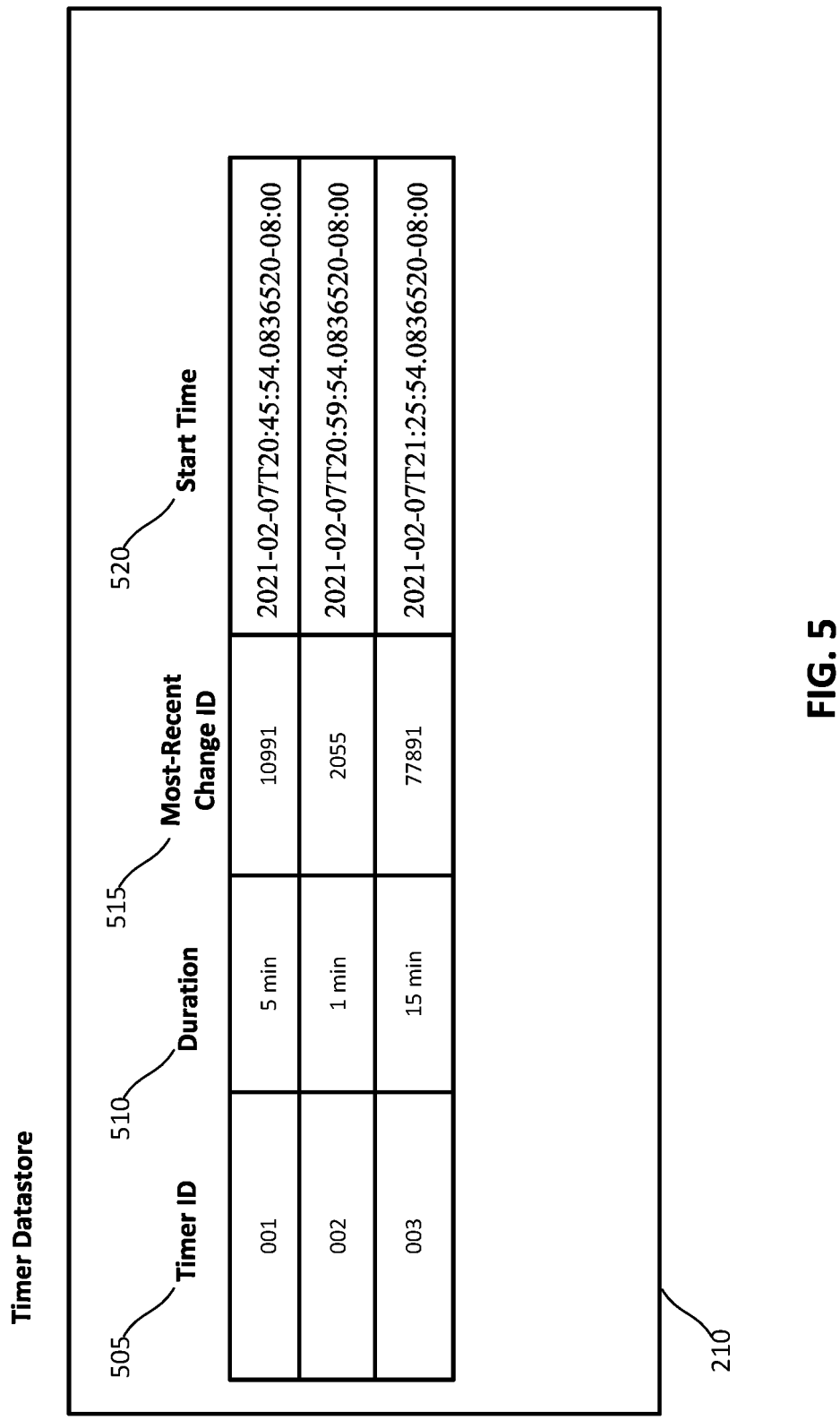
FIG. 5 is diagram showing an example implementation of the timer datastore shown in FIG. 2.

FIG. 5 is a diagram showing an example implementation of the timer datastore 210 in which the timer datastore currently has entries for three timers. Each timer datastore entry may include a timer identifier 505, a duration 510, and a most-recently received change identifier 515. The timer datastore 210 stores a single entry for each timer. The timer identifier 505 may be set to the timer identifier assigned to the timer by the timer creator 205. The duration 510 may be set to be the duration 620 included in the timer request message 605 or determined based on the telemetry data type or category, the start time 520 may be set to the start time 625, and the most-recently received change identifier 515 may be set to the timer change identifier 615. The timer datastore 210 may be updated by the timer creator 205 to keep track of the most recently received timer message associated with each timer. The timer responder 220 may be configured to process only the most-recently received timer message as will be discussed in greater detail in the examples which follow.

Figure 7:
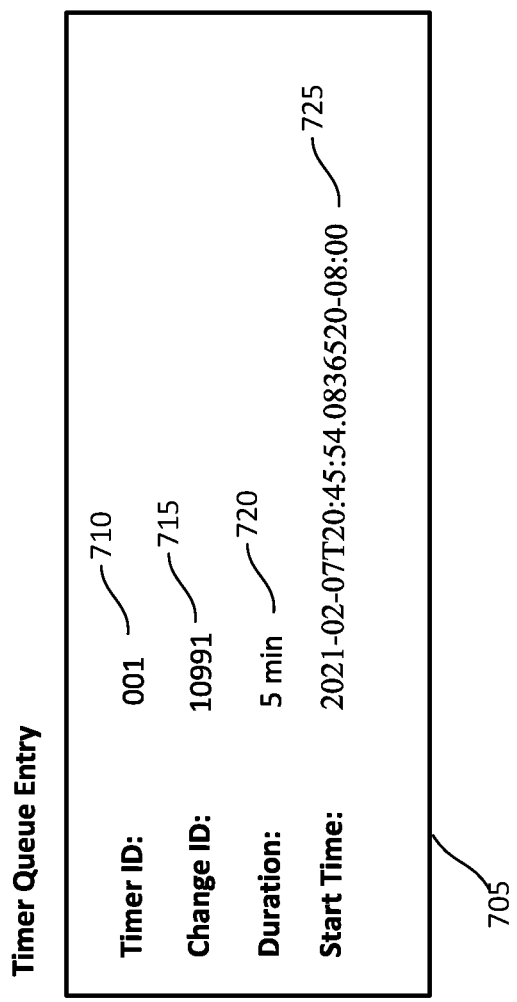
FIG. 7 shows an example of a timer queue entry that may be inserted into a timer queue of the timer queues shown in FIG. 2.

The timer creator 205 may also be configured to create a timer queue entry for each timer message, telemetry data, or other indication of a timer change received by the timer service 110. FIG. 7 shows an example of a timer queue entry 705 that may be inserted into the timer queue 215. The timer queue is a first in and first out (FIFO) data structure in which timer queue entries representing the timer messages received by the timer service 110 are created and inserted in the order which the timer messages are received. The timer queue entry 705 includes a timer identifier 710 which may be set to the timer identifier 610 included in the timer request message 605 or obtained from the telemetry data. The timer queue entry 705 may include a timer change identifier 715 which may be set to the timer change identifier 615 associated with the timer request message 605. The timer queue entry 705 may also include a duration 720 which may be set to the duration 620 from the timer request message 605 or set based on a category or type of telemetry data received. The timer queue entry 705 may also include a start time 725 which may be set to the time at which the timer creator 205 receives the timer message.

Figure 4:
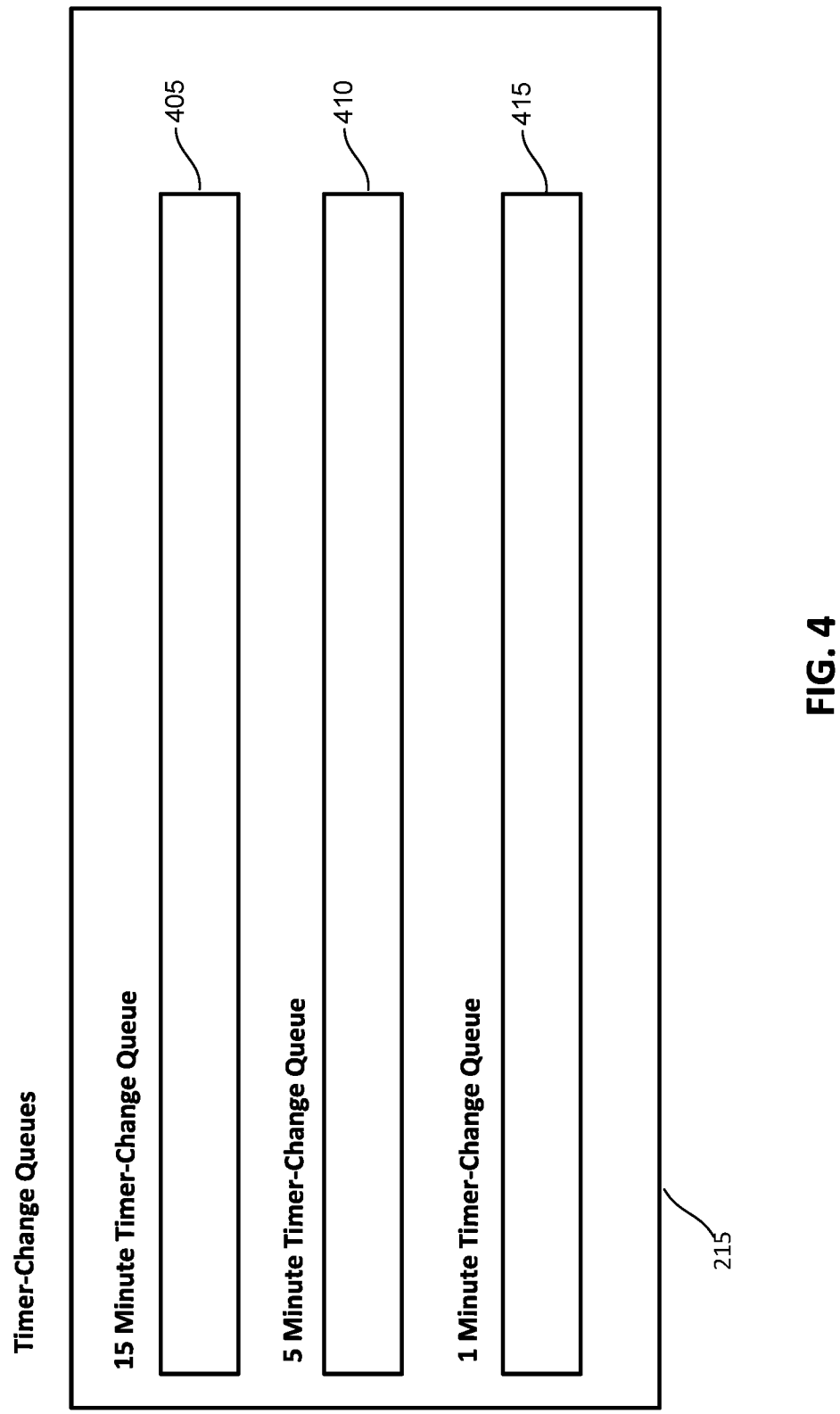
FIG. 4 is a diagram that shows an example implementation of the timer queues shown in FIG. 2.

The timer queue 215 may include one or more timer queues. Each timer queue may be associated with a different timer wait interval. The timer wait interval of the timer queue indicates how frequently the timer responder 220 checks the timer queue for timer queue entries to be processed. Each of the timer queues is a FIFO queues. Timer queue entries are processed in the order in which they are added to the queue. The processing of the queue entries will be discussed further in the examples which follow. FIG. 4 is a diagram that shows an example implementation of the timer queue 215 that includes a 1-minute queue 415, a 5-minute queue 410, and a 15-minute queue 405. The timer creator 205 may be configured to insert a new timer entry into a queue based on the duration 720 of the timer queue entry 705 and the timer wait interval associated with the timer queue. For example, if a first timer message is received to create a timer with a 2-minute duration, the timer creator 205 may insert a timer queue entry 705 into the 1-minute queue 415 and the timer queue entry 705 may pass through the timer queue twice to reach the full 2-minute duration. The timer responder 220 may reinsert the timer queue entry 705 into the 1-minute queue 415 once the timer entry 705 reaches the front of the timer queue.

The timer responder 220 may also be configured to move timer entries between timer queues. For example, the timer creator 205 may insert a second timer entry for a second timer request message 605 having a duration of 20 minutes into the 15-minute queue 405, and the timer responder 220 may move the timer entry from the 15-minute queue 405 to the 5-minute queue 410 after 15 minutes has passed and the timer queue entry 705. The duration of the timer entry 705 may be decreased by the timer wait interval associated with the timer queue in which the timer queue entry 705 was included. In this example, the duration of the timer queue entry would be decreased from 20 minutes to 5 minutes. The timer responder 220 may also be configured to determine that the timer queue entry 705 represents the current state of the timer. As will be discussed in detail in the examples which follow, the timer responder 220 may discard timer queue entries that are not representative of the current state of the timer in order to conserve computing and memory resources of the timer service 110. In some implementations, the timer queue entry 705 that represents the current state of the timer may be the timer queue entry 705 associated with the most-recently received timer queue message 605 for that timer.

Figure 3A:
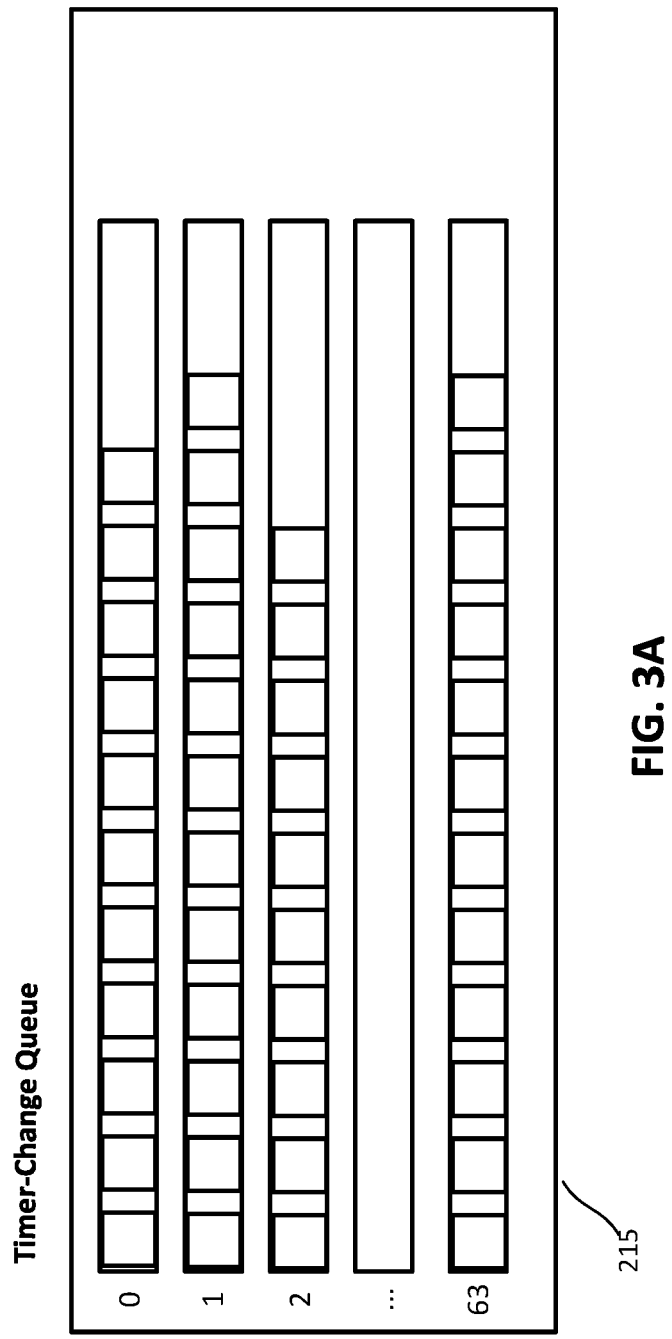
FIG. 3A is a diagram of a timer queue that includes multiple partitions.

Each of the timer queue(s) 215 may also be subdivided into partitions as shown in the example of FIG. 3A. In the example shown in FIG. 3A, the timer queue is subdivided into 64 partitions numbered 0 to 63. Other implementations may include a different number of partitions. The boxes shown in each of the partitions represent timer queue entries within that partition. The timer creator 205 and the timer responder 220 may be configured to insert a timer queue entry 705 in a partition of the timer queue based on the timer identifier 610 of the timer queue entry 705. The timer creator 205 and the timer responder 220 may apply a hash function to the timer identifier 610 to obtain a partition identifier of the partition into which the timer queue entry should be inserted. All the timer queue entries associated with a particular timer will be inserted to the same partition. The hash function may be selected to cause the timer entries to be distributed approximately evenly across the partitions of the timer queue. The timer responder 220 applies the same timer wait interval to each of the partitions of the timer queue in contrast to implementations which include separate timer queues having different timer wait intervals.

The timer responder 220 is configured to process the timer entries 705 in the timer queue 215. As discussed above, each timer queue may be associated with a timer wait interval. The timer responder 220 may process the timer queue entries 705 starting with the front of the queue. The timer responder 220 may determine whether to process the first entry in the timer queue by determining whether the timer duration 720 of the timer queue entry 705 is greater than the timer wait interval associated with the timer queue in which the timer entry 605 is located. If the timer duration 720 exceeds the timer queue wait interval, the timer queue wait interval is subtracted from the timer duration 720 to determine the remaining duration for the timer queue entry 705, and the timer duration 720 of the timer queue entry 705 is updated with this remaining duration.

The timer responder 220 may also move the timer queue entry 705 to another timer queue that has a smaller timer queue wait interval. For example, referring back to the example shown in FIG. 4, the timer queue(s) 215 include a 5-minute queue 410 and a 1-minute queue 415. The timer responder 220 may move the timer queue entry 705 being processed from the front of the 5-minute queue 410 to the back of the 1-minute queue 415 in response to the remaining duration associated with the time queue entry 705 being 1 minute. The timer responder 220 may be configured to move time entries between queues having different time queue wait intervals in other implementations.

If the timer duration 720 of the timer queue entry 705 at the front of the timer queue is less than or equal to the timer queue wait interval for that queue, the timer responder 220 then makes a determination that the time associated with the timer queue entry 705 has elapsed. The timer responder 220 may then make a determination whether the timer queue entry 705 is the most-recently received entry in the timer queue associated with that timer. The timer responder 220 may access the timer datastore 210 to obtain the most-recently received change identifier 515 associated with the timer. If the most-recently received change identifier 515 matches the timer change identifier 715 of the timer queue entry 705, then the timer queue entry 705 is the most-recently received timer queue entry for that timer.

If both the duration 720 of the timer request message 605 and the timer queue entry 705 is the most-recently received timer queue entry for the timer, then the timer responder 220 may determine that the timer has elapsed. Responsive to the timer elapsing, the timer service 110 may then send a message indicating that the timer has elapsed to the entity that requested that the timer be created and may also or alternatively be configured to trigger the execution of one or more processes on the entity that requested the creation of the timer and/or one or more other entities configured to operate with the timer service 110.

However, if the timer change identifier 715 of the timer queue entry 705 does not match the most-recently received change identifier 515 of the timer's entry in the timer datastore 210, then the timer responder 220 may discard the timer queue entry 705. This indicates that the timer has been reset or modified since the message associated with the time queue entry 705 was received and the timer service 110 may safely discard the message and continue processing the contents of the message queue to find the most-recently received time queue entry associated with the timer.

FIG. 3B is a diagram that shows an example of entries in a partition of a timer queue. FIG. 3B is a diagram of a partition 305 of the timer queue shown in FIG. 3A that includes timer queue entries. The timer queue shown in FIG. 3 may be, for example, the "0" partition of set of 64 partitions of the timer queue 215 shown in FIG. 3A. In the example shown in FIG. 3B, the partition 305 includes eleven timer queue entries 705 labeled 1 to 11. A new timer request message 605 is received by the timer service 110, and the timer creator 205 may append a new timer queue entry 705 having a sequence number 12 at the end of the partition. As discussed in the preceding examples, the timer creator 205 may determine that the new timer queue entry 705 belongs with the partition 305 by applying a hash function to the timer identifier of the timer to which the timer message applies.

In the example implementation shown in FIG. 3B, a checkpoint 310 is maintained. The checkpoint 310 records the location in the timer queue or partition thereof where the timer responder 220 resumes processing the queue at the end of the next timer wait interval. In this example, timer queue entries 705 with indices 1, 2, and 3 have already been processed and the timer queue entry having index 4 should be processed when the timer responder 220 resumes processing timer queue entries after the next timer wait interval has passed. The timer queue entries 705 having indices 1, 2, and 3 may be retained in the queue for at least a period of time before being discarded. The timer service 110 may utilize a retention configuration to determine how long to retain the timer queue entries 705 before discarding them. In other implementations, the checkpoint 310 may not be utilized. Instead, the timer responder 220 may discard timer entries as they are read and processed. Because the timer entries are discarded as they are read, the checkpoint 310 is not required in such implementations.

The time queue entries 705 within the partition 305 are inserted into the queue chronologically based on the time that the corresponding timer request message 605 is received by the timer service 110. Thus, the start time 725 of the timer queue entries 705 monotonically increase from the front of the timer queue to the end of the timer queue. Therefore, if the time has not yet passed for the first timer queue entry 705 in the partition, then the time will not have yet passed for the subsequent timer queue entries 705 in the partition of the timer queue.

The timer responder 220 may determine when to process timer queue entries by calculating a difference between the current timestamp 320 and the start time 725 associated with a timer entry 725 currently at the beginning of the timer queue 215:

$$D=C-S \qquad \text{(equation 1)}$$

where D represents the difference, C represents the current timestamp 320, and S represents the start time 725 associated with the timer entry 725. The timer responder 220 may then compare the difference with the timer wait interval I associated with the timer queue 215 to determine how to process the timer queue entry 705 at the front of the partition 305 of the timer queue 215.

If D>=I, the timer responder 220 may process the timer queue entry 705 at the front of the partition 305. For example, where the duration of the timer queue entry 705 is 5 minutes and the timer wait interval is also five minutes. The timer responder 220 may process the timer queue entry 705. The timer responder 220 may check whether the timer queue entry 705 is the most-recently received timer queue entry 705 associated with the timer by querying the timer data store 210 to access the timer data store entry associated with the timer. The timer responder 220 may then compare the most-recent change identifier 515 of the timer data store entry with the timer change identifier 715. If the most-recent change identifier 515 matches timer change identifier 715, the timer queue entry 705 is associated with the most-recently received timer message for the timer. The timer responder 220 may then send a message to the entity that requested creation of the timer and/or perform one or more specified actions associated with the timer. The one or more specified actions may be defined in the timer request message received to create the timer in implementations where a timer request messages is created. Alternatively, the timer service 110 may be configured to perform specific actions based on the source of the initial timer request. Thus, multiple types of data processing systems and/or services may utilize the timer service 110, and the timer service 110 may be configured to perform specific actions in response to the timer elapsing for each of the data processing systems and/or services. Alternatively, the timer service 110 may be configured to perform one or more specified actions based on a type or category of telemetry data received that triggered the creation of the timer. Accordingly, different timers may be configured to trigger different actions to be performed by the timer service 110 and/or other data processing systems or services. In some implementations, the action to be performed in response to the timer elapsing may be stored in the timer entry in the timer datastore 210. The timer responder 220 may then move on to a next timer queue entry 705 in the queue. However, if the most-recent change identifier 515 does not match the timer change identifier 715, then the timer responder 220 may discard the timer queue entry 705 and move on to a next timer queue entry in the partition 305.

If D<I, the timer responder 220 may process the timer queue entry 705 at the front of the partition 305. The difference between the current timestamp 320 and the start time 725 associated with a timer entry 725 is less than the timer interval. In some instances, the duration 720 associated with the timer queue entry 705 may be less than the timer wait interval. For example, if the duration 720 of the timer queue entry 705 is 3 minutes, but the timer wait interval is 5 minutes, the timer responder 220 will wait for the full 5 minutes associated with the timer wait interval before processing the timer queue entry. In other instances, the duration 720 associated with the timer queue entry 705 may be greater than the wait timer interval. For example, if the duration 720 of the timer queue entry 705 is 7 minutes, but the timer wait interval is 5 minutes, the timer responder 220 may be configured to wait the 2 additional minutes associated with the duration before processing the timer queue entry 705. The timer responder 220 may be configured to handle this situation in a couple of different ways. In implementation where there are multiple timer queues having different timer wait intervals, the timer responder 220 may move the timer queue entry 705 to another queue. For example, the timer responder 220 may move the timer queue entry 705 from a 5-minute queue to a 1-minute queue where the duration 720 was 7 minutes and 5 minutes has passed in the 5-minute queue. The duration 720 of the timer queue entry 705 may be set to 2 minutes, and the timer queue entry 705 may be moved to the back of the 1-minute timer queue. The timer queue entry 705 would then wait in the 1-minute timer queue twice before being processed by the timer responder 220. The duration 720 would be reduced to 1 minute after the timer queue entry 705 after the first timer wait interval of 1 minute.

In the example shown in FIG. 3B, the checkpoint 310 is at the timer queue entry 705 at position 4 within the partition of the timer queue. The timer queue entries 705 at positions 4, 5, and 7 have the same timer identifier in this example, as shown by the timer queue entry details 315. The timer queue entry 705 at position 7 is the most-recently received entry as shown in the timer datastore entry 325 for the timer with the timer identifier "31d4b895-1c70-48eb-aac1-acd4d775e5ef". Thus, the timer entries at positions 4 and 5 in the timer queue also associated with this timer may be ignored or discarded.

A technical benefit of the approach discussed above is that the timer service 110 is highly scalable without significantly increasing the computing resources necessary to support the additional timers. The timer service 110 may receive a high volume of timer messages to reset and/or modify a timer. However, the timer service 110 does not need to reset and/or modify the timer for each of these messages. As can be seen from the preceding examples, only timer messages (or the corresponding timer queue entries for those messages that have been inserted into a timer queue) that have already past the timeout specified by the timer duration. This approach ensures that the timer does not need to be reset numerous times in high volume, distributed computing environments where hundreds, thousands, or millions of timer messages may be received for numerous timers. As a result, the memory and computing resources required to provide the distributed timer may be significantly reduced.

Figure 8:
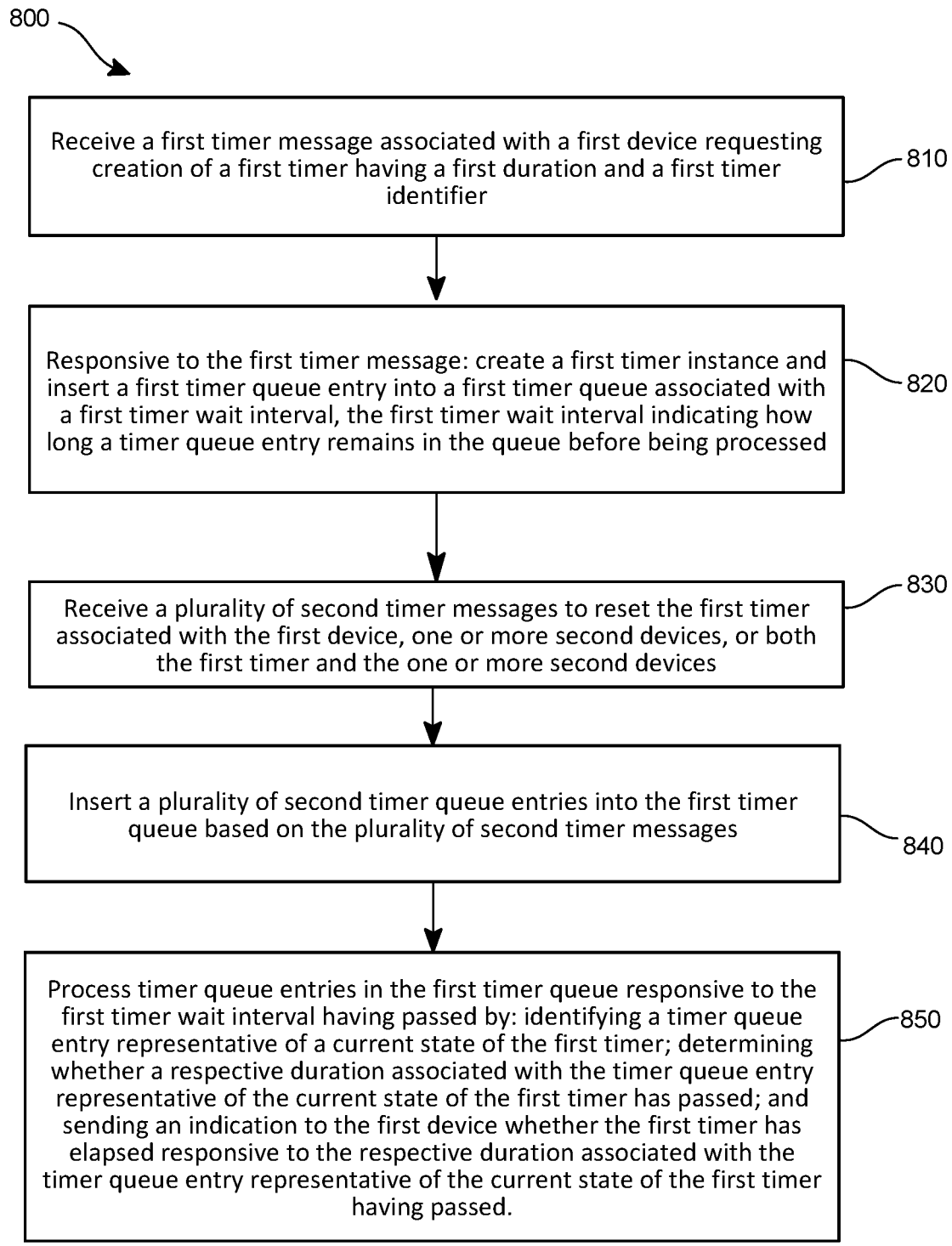
FIG. 8 is a flow chart of an example process for providing a distributed timer.

FIG. 8 is a flow chart of an example process 800 for providing a distributed timer. The process 800 may be implemented by the timer service 110 discussed in the preceding examples.

The process 800 may include an operation 810 of receiving a first timer message associated with a first device requesting creation of a first timer having a first duration and a first timer identifier. As discussed in the preceding examples, the timer service 110 may receive a timer message requesting the creation of a new timer. The timer message may be a timer request message 605 or may be implicit from telemetry data received by the timer service 110. The first device may be a computing device, such as the computing devices 105a-105c, may be a service, such as the application service 125, or another device. In some implementations, the first device may send the timer request message or telemetry data to the timer service. In other implementations, another device may send the request or telemetry data to the timer service on behalf of the first device, such as a hub or other device which may handle sending timer messages on behalf of the first device.

The process 800 may include an operation 820 of, responsive to the first timer message, creating a first timer, and inserting a first timer queue entry 705 into a first timer queue 215 associated with a first timer wait interval. The first timer wait interval indicates how long a timer queue entry 705 remains in the queue before being processed by the timer responder 220. The timer creator 205 may create an entry for the new timer in the timer datastore 210 and insert a timer queue entry 705 in the timer queue 215 in response to receiving the first timer message 705.

The process 800 may include an operation 830 of receiving a plurality of second timer messages to reset the first timer associated with the first device, one or more second devices, or both the first device and the one or more second devices. Additional timer messages to reset and/or update the duration of the first timer may be received from a computing device, such as the computing devices 105a-105c, and/or a service, such as the application service 125.

The process 800 may include an operation 840 of inserting a plurality of second timer queue entries 705 into the first timer queue based on the plurality of second timer messages 605. The second timer queue entries 705 may be inserted into the timer queue in an order in which the timer messages are received by the timer service 110. As discussed in the preceding examples, the timer creator 205 can receive additional timer messages 605 or telemetry data associated with a timer once the timer has been created. The timer creator 205 may be configured to update the entry for the timer in the timer datastore 210 for each of the second timer messages 605 or telemetry data and to insert a new timer queue entry 705 into the timer queue 215.

The process 800 may include an operation 850 of processing timer queue entries in the first timer queue responsive to the first timer wait interval having passed by: identifying a timer queue entry representative of a current state of the first timer, determining whether a respective duration associated with the timer queue entry representative of the current state of the first timer has passed, and sending an indication to the first device whether the first timer has elapsed responsive to the respective duration associated with the timer queue entry representative of the current state of the first timer having passed. The timer queue entry representative of the current state of the first timer may be the most recently received timer queue entry associated with the first timer, as indicated in the preceding examples, or may be different specified timer entry in other implementations. The timer responder 220 may determine that the timer has elapsed by comparing the timer queue entry 705 at the front of the timer queue with the most-recently received message information to determine whether the timer has elapsed as discussed in the preceding examples.

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
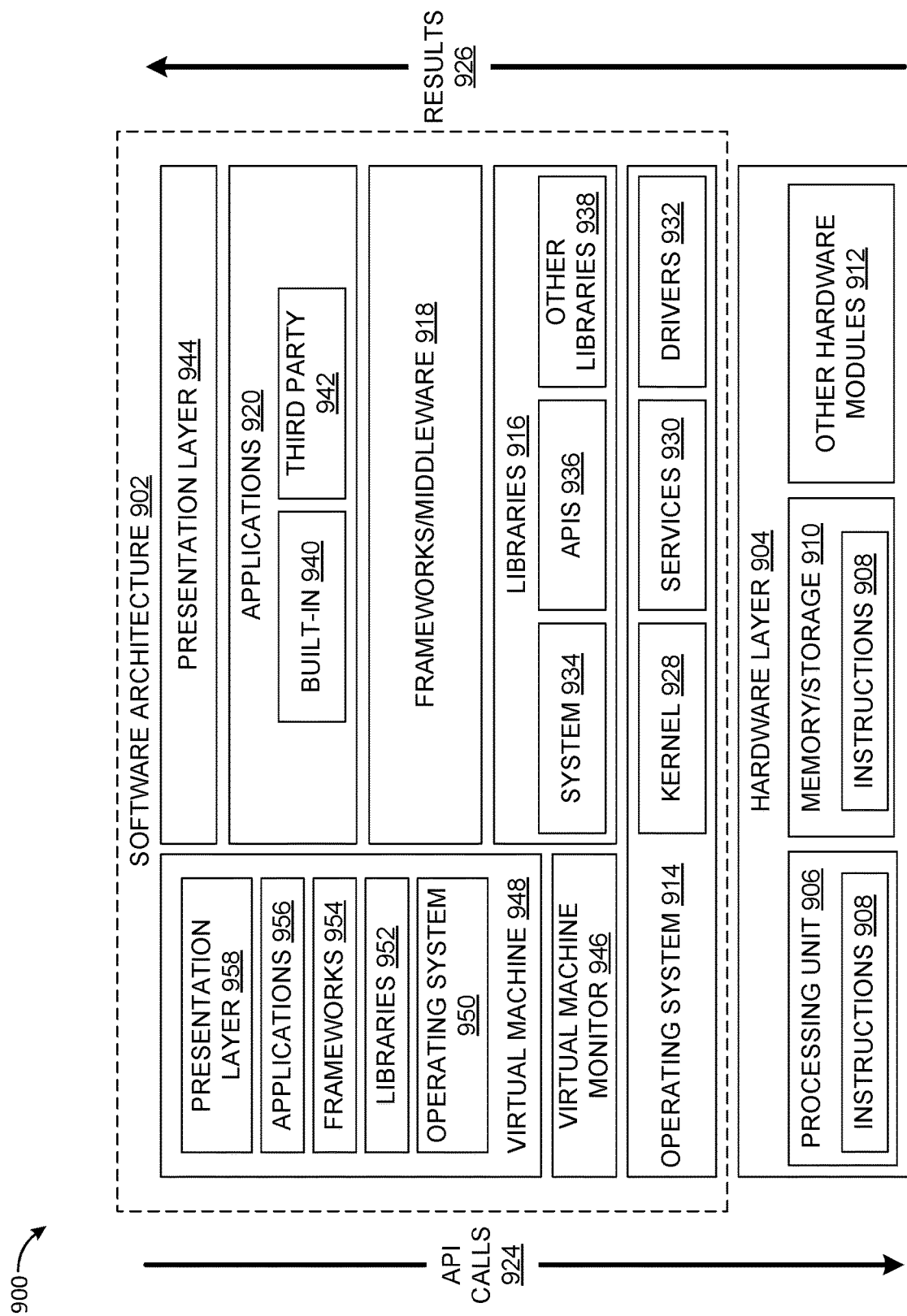
FIG. 9 is a block diagram showing an example software architecture, various portions of which may be used in conjunction with various hardware architectures herein described, which may implement any of the described features.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
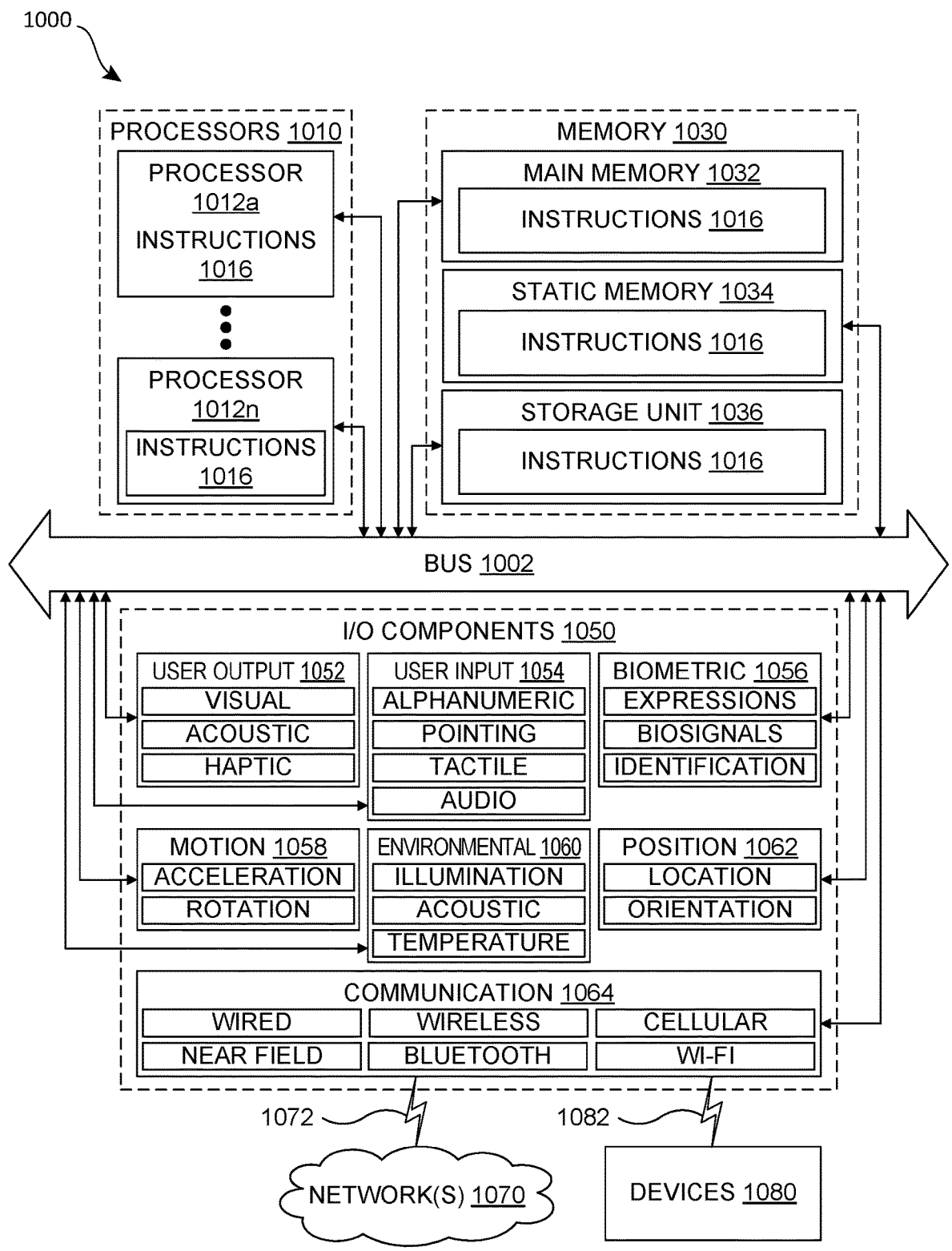
FIG. 10 is a block diagram showing components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012$a$ to 1012$n$ that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions that, when executed, cause the processor to perform operations comprising:
      receiving a first timer message associated with a first device requesting creation of a first timer having a first duration and a first timer identifier;
      responsive to the first timer message:
         creating a first timer; and
         inserting a first timer queue entry into a first timer queue associated with a first timer wait interval, the first timer wait interval indicating how long a timer queue entry remains in the first timer queue before being processed;
      receiving a plurality of second timer messages to reset the first timer associated with the first device, one or more second devices, or both the first device and the one or more second devices;
      inserting a plurality of second timer queue entries into the first timer queue based on the plurality of second timer messages;
      processing timer queue entries in the first timer queue responsive to the first timer wait interval having passed by:
         identifying a timer queue entry representative of a current state of the first timer;
         determining whether a respective duration associated with the timer queue entry representative of the current state of the first timer has passed; and
         sending an indication to the first device whether the first timer has elapsed responsive to the respective duration associated with the timer queue entry representative of the current state of the first timer having passed.

2. The data processing system of claim 1, wherein the timer queue entry representative of the current state of the first timer is associated with a most recently received timer message associated with the first timer.

3. The data processing system of claim 2, wherein, to create the first timer responsive to receiving the first timer message, the computer-readable medium includes instructions configured to cause the processor to perform operations of:
   creating a first timer entry for the first timer in a timer data store;
   setting a value of a timer duration field of the first timer entry to the first duration of the first timer;
   setting a value of a most-recent timer message identifier field of the first timer entry to a timer message identifier associated with first timer message; and
   setting a value of a duration field of the first timer entry to the first duration associated with the first timer.

4. The data processing system of claim 3, wherein each timer queue entry of the first timer queue includes a timer identifier field storing a timer identifier of a timer associated with the timer queue entry, a timer message identifier field storing an identifier associated with a timer message for which the timer queue entry was created, and a received field storing an indication of when the timer message was received.

5. The data processing system of claim 4, wherein each of the timer messages of the plurality of second timer messages includes a respective timer duration, and wherein the computer-readable medium includes instructions configured to cause the processor to perform:
   updating the first timer entry in the timer data store by setting the value of the timer duration field to the respective timer duration associated with the respective timer queue entry being inserted into the first timer queue.

6. The data processing system of claim 5, wherein the computer-readable medium includes instructions configured to cause the processor to perform:
   updating the first timer entry in the timer data store by setting the most-recent timer message identifier to a message identifier associated with the respective timer queue entry being inserted into the first timer queue.

7. The data processing system of claim 4, wherein the first timer queue comprises a plurality of partitions, and wherein, to create the first timer queue entry in the first timer queue, the computer-readable medium includes instructions configured to cause the processor to perform:
   assigning the first timer queue entry to a first partition of the first timer queue based on the first timer identifier associated with the first timer queue entry.

8. The data processing system of claim 7, wherein assigning the respective timer queue entry to the first partition the computer-readable medium includes instructions configured to cause the processor to perform operations of:
   determining a hash of the first timer identifier associated with the first timer; and
   assigning the first timer message to the first partition of the first timer queue based on the hash of the first timer identifier.

9. The data processing system of claim 8, wherein a third timer message included in the plurality of second timer messages is associated with a second timer, and wherein the computer-readable medium includes instructions configured to cause the processor to perform operations of:
   creating a respective timer queue entry for the third message; and assigning the respective timer queue entry to a second partition based on a second timer identifier associated with the second timer.

10. The data processing system of claim 4, wherein the computer-readable medium includes instructions configured to cause the processor to perform operations of:
receiving a third timer message associated with the first timer, wherein the third timer message is associated with a third timer duration; and
assigning the third timer message to the first timer queue or a second timer queue based on the third timer duration.

11. A method implemented in a data processing system for providing a distributed timer, the method comprising:
receiving a first timer message associated with a first device requesting creation of a first timer having a first duration and a first timer identifier;
responsive to the first timer message:
creating a first timer; and
inserting a first timer queue entry into a first timer queue associated with a first timer wait interval, the first timer wait interval indicating how long a timer queue entry remains in the first timer queue before being processed;
receiving a plurality of second timer messages to reset the first timer associated with the first device, one or more second devices, or both the first device and the one or more second devices;
inserting a plurality of second timer queue entries into the first timer queue based on the plurality of second timer messages;
processing timer queue entries in the first timer queue responsive to the first timer wait interval having passed by:
identifying a timer queue entry representative of a current state of the first timer;
determining whether a respective duration associated with the timer queue entry representative of the current state of the first timer has passed; and
sending an indication to the first device whether the first timer has elapsed responsive to the respective duration associated with the timer queue entry representative of the current state of the first timer having passed.

12. The method of claim 11, wherein the timer queue entry representative of the current state of the first timer is a most recently received timer queue entry associated with the first timer.

13. The method of claim 12, wherein creating the first timer responsive to receiving the first timer message further comprises:
creating a first timer entry for the first timer in a timer data store;
setting a value of a timer duration field of the first timer entry to the first duration of the first timer;
setting a value of a most-recent timer message identifier field of the first timer entry to a timer message identifier associated with first timer message; and
setting a value of a duration field of the first timer entry to the first duration associated with the first timer.

14. The method of claim 13, wherein each timer queue entry of the first timer queue includes a timer identifier field storing a timer identifier of a timer associated with the timer queue entry, a timer message identifier field storing an identifier associated with a timer message for which the timer queue entry was created, and a received field storing an indication of when the timer message was received.

15. The method of claim 14, wherein each of the timer messages of the plurality of second timer messages includes a respective timer duration, and the method further comprising:
updating the first timer entry in the timer data store by setting the most-recent timer message identifier to a message identifier associated with the respective timer queue entry being inserted into the first timer queue.

16. A computer-readable storage medium on which are stored instructions that, when executed, cause a processor of a programmable device to perform operations of:
receiving a first timer message associated with a first device requesting creation of a first timer having a first duration and a first timer identifier;
responsive to the first timer message:
creating a first timer; and
inserting a first timer queue entry into a first timer queue associated with a first timer wait interval, the first timer wait interval indicating how long a timer queue entry remains in the first timer queue before being processed;
receiving a plurality of second timer messages to reset the first timer associated with the first device, one or more second devices, or both the first device and the one or more second devices;
inserting a plurality of second timer queue entries into the first timer queue based on the plurality of second timer messages;
processing timer queue entries in the first timer queue responsive to the first timer wait interval having passed by:
identifying a timer queue entry representative of a current state of the first timer;
determining whether a respective duration associated with the timer queue entry representative of the current state of the first timer has passed; and
sending an indication to the first device whether the first timer has elapsed responsive to the respective duration associated with the timer queue entry representative of the current state of the first timer having passed.

17. The computer-readable storage medium of claim 16, wherein the timer queue entry representative of the current state of the first timer is a most recently received timer queue entry associated with the first timer.

18. The computer-readable storage medium of claim 17, wherein, to create the first timer responsive to receiving the first timer message, the computer-readable storage medium includes instructions configured to cause the processor to perform operations of:
creating a first timer entry for the first timer in a timer data store;
setting a value of a timer duration field of the first timer entry to the first duration of the first timer;
setting a value of a most-recent timer message identifier field of the first timer entry to a timer message identifier associated with first timer message; and
setting a value of a duration field of the first timer entry to the first duration associated with the first timer.

19. The computer-readable storage medium of claim 18, wherein each timer queue entry of the first timer queue includes a timer identifier field storing a timer identifier of a timer associated with the timer queue entry, a timer message identifier field storing an identifier associated with a timer message for which the timer queue entry was created, and a received field storing an indication of when the timer message was received.

20. The computer-readable storage medium of claim 19, wherein each of the timer messages of the plurality of second timer messages includes a respective timer duration, and wherein the computer-readable storage medium includes instructions configured to cause the processor to perform:
 updating the first timer entry in the timer data store by setting the most-recent timer message identifier to a message identifier associated with the respective timer queue entry being inserted into the first timer queue.

* * * * *